July 12, 1955 C. D. BOCK 2,713,143
ELECTRO-MECHANICAL RESOLVERS
Filed April 25, 1951
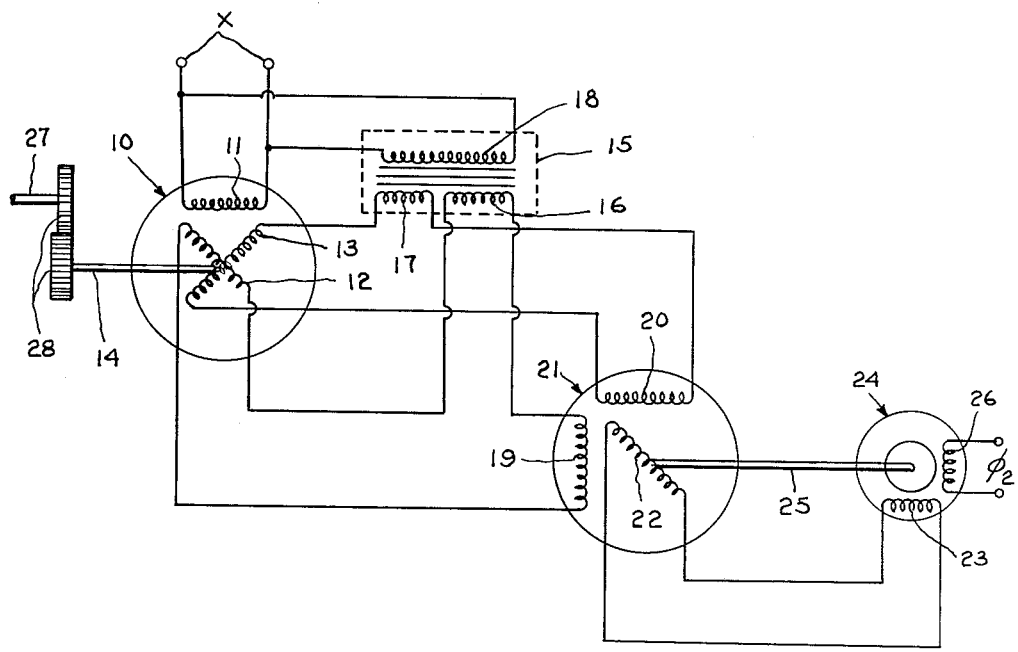
INVENTOR.
CHARLES D. BOCK
BY Raymond A. Paquin
ATTORNEY.

2,713,143

ELECTRO-MECHANICAL RESOLVERS

Charles Dickens Bock, New York, N. Y., assignor to American Bosch Arma Corporation Application April 25, 1951, Serial No. 222,919

5 Claims. (Cl. 323—52)

This invention relates to electro-mechanical resolvers and correction means therefor which compensate for errors arising in the rotor drive gears.

The rotor of the resolver, usually carrying the secondary windings, is positioned by a drive shaft mechanically connected to the rotor by input gearing. If the input gears are imperfect, i. e. are eccentric, errors in the output voltages of the secondary windings result, which may be corrected with the present invention.

Errors due to the gear eccentricity are corrected by adding a voltage proportional to the resolver excitation voltage to the output of each resolver secondary winding. This voltage is supplied by a transformer having one primary winding and two secondary windings in which the transformer primary winding is connected across the resolver primary winding, and each transformer secondary winding is connected in series with one of the resolver secondary windings.

For a more complete understanding of the invention reference may be had to the figure of the accompanying drawing which illustrates the application of the invention in a typical simplified computing circuit.

The drawing shows a resolver 10 having a primary winding 11, and secondary windings 12 and 13 which are electrically connected to the stator windings 19 and 20 respectively of resolver 21. The rotor winding 22 of resolver 21 energizes the control field winding 23 of motor 24 whose shaft 25 drives the rotor winding 22 of resolver 21. The main field winding 26 is energized by a constant voltage in quadrature with the control field 23 voltage, so that motor 24 drives rotor winding 22 until the winding 22 is aligned with the null field of resolver 21 and control field winding 23 is deenergized.

Assuming that resolvers 10 and 21 are perfect and disregarding the effects of transformer 15 for the moment (by considering the secondary windings 16 and 17 to be short circuited) it is well known that the angular displacement of shaft 25 corresponds to the angular displacement of shaft 14 when motor 24 is deenergized.

Shaft 14 is driven by shaft 27 through 1:1 drive gears 28 so that with perfect gearing 28 the displacement of shaft 14 corresponds to the displacement of shaft 27. However, if eccentricity exists in the drive gears 28, which is the condition where either one or both of gears 28 has its axis of rotation displaced from the center of the gear, an error of the form $C \cos \phi + E \sin \phi$ exists between the angular displacements of shafts 14 and 27 where C and E are constants and $\phi$ in the angular displacement of shaft 27, so that the output voltages of rotor windings 12 and 13 are in error, i. e. they are not proportional to $\sin \phi$ and $\cos \phi$ respectively.

This error may be corrected by the circuit shown in Fig. 1. The primary winding 18 of transformer 15 is energized by the input signal X to stator winding 11 of resolver 10. One secondary winding 16 of transformer 15 is connected in series with rotor winding 12 of resolver 10 and stator winding 19 of resolver 21, while the other secondary winding 17 is connected in series with rotor winding 13 and stator winding 20.

With transformation ratios of $f$ and $g$ between primary winding 18 and secondary windings 16 and 17 respectively the amplitudes of the voltages at secondary windings 16, 17 are $fX$ and $gX$ respectively. For a displacement Z of shaft 14, the amplitude of the voltage energizing stator winding 19 is proportional to $X \sin Z + fX$ while the amplitude of the voltage energizing stator winding 20 is proportional to $X \cos Z + gX$. When motor 24 drives the rotor winding 22 to the non-inductive position, corresponding to an angular displacement of M, then $$(X \sin Z + fX) \cos M - (X \cos Z + gX) \sin M = 0 \quad (1)$$

Dividing by X, Equation 1 may be rewritten as $$\sin Z \cos M + f \cos M - \cos Z \sin M - g \sin M = 0 \quad (2)$$

or $$\sin M \cos Z - \cos M \sin Z = f \cos M - g \sin M \quad (3)$$

whence $$\sin (M-Z) = f \cos M - g \sin M \quad (4)$$

Since $(M-Z)$ or $\Delta M$ is small, $\sin \Delta M$ is substantially equal to $(\Delta M)$ in radian measure, and $$\Delta M = f \cos M - g \sin M \quad (5)$$

Comparison of Equation 5 with the error due to drive gear eccentricity, $C \cos \phi + E \sin \phi$, shows these differences to be of the same form. Proper selection of the transformation ratios $f$ and $g$ and proper phasing of the output voltages of the secondary windings 16 and 17 reduces the error between the displacement of shafts 25 and 27 due to the eccentricity of gears 28 to zero.

Therefore, it will be seen that the signal outputs of the resolver 10 which are applied to stator windings 19 and 20 are proportional in magnitude to $X \cos \phi$ and $X \sin \phi$ respectively, and the errors in the output signals of resolver 10 due to gear eccentricity are eliminated.

Either the secondary windings may be carried by the rotor, as shown in Fig. 1 and the primary winding carried by the stator, in which case the correction is applied to the rotor windings although if desired, the primary winding could be carried by the rotor and the secondary windings carried by the stator in which case the correction would also be applied to the secondary windings.

From the foregoing it will be seen that I have provided means for obtaining all of the objects and advantages of the invention.

I claim:

1. In an electro-mechanical resolver having a rotor, a winding carried by said rotor, a stationary winding, a drive shaft, gear means for driving said drive shaft and electrical means for correcting for imperfections in said gear means, said electrical means including a transformer having a primary winding connected to the resolver primary winding and a secondary winding connected to the resolver secondary winding.

2. In an electro-mechanical resolver having a rotor, a primary winding, a secondary winding, one of said windings being carried by said rotor, a drive shaft, gear means for driving said drive shaft and electrical means for correcting for imperfections in said gear means, said electrical means comprising a transformer having a primary winding connected to the resolver primary winding and a secondary winding connected to the resolver secondary winding and being adapted to add a voltage proportional to the resolver excitation voltage to the output of said secondary winding.

3. In an electro-mechanical resolver having a rotor, secondary windings carried by said rotor, a drive shaft for said rotor, gear means for driving said drive shaft and electrical means connected to said secondary windings for correcting for imperfections in said gear means, said electrical means comprising a transformer having a primary winding connected in parallel to the resolver primary winding and a secondary winding connected in series to the resolver secondary winding adapted to add a voltage proportional to the resolver excitation voltage to the output of each resolver secondary winding.

4. In an electro-mechanical resolver having a rotor, a pair of substantially perpendicular secondary windings carried by said rotor, a shaft for said rotor, gear means adapted to drive said shaft and rotor and electrical means adapted to add a voltage proportional to the resolver excitation voltage to the output of each resolver secondary winding and thereby compensate for errors in said gear means, said electrical means comprising a transformer having a primary winding connected to the resolver primary winding and a secondary winding connected to the resolver secondary winding.

5. In an electro-mechanical resolver having a rotor, a pair of substantially perpendicular secondary windings carried by said rotor, a shaft for said rotor, gear means adapted to drive said shaft and rotor and a transformer having a primary winding connected to the resolver primary winding and a secondary winding connected to the resolver secondary winding adapted to add a voltage proportional to the resolver excitation voltage to the output of each resolver secondary winding and thereby compensate for errors in said gear means.

References Cited in the file of this patent

UNITED STATES PATENTS

| | | |
|---|---|---|
| 1,977,624 | Davis | Oct. 23, 1934 |
| 2,519,058 | Lundberg et al. | Aug. 15, 1950 |
| 2,528,512 | Greenough | Nov. 7, 1950 |
| 2,537,083 | Peoples | Jan. 9, 1951 |